UNITED STATES PATENT OFFICE.

OSCAR J. LANIGAN, OF CHICAGO, ILLINOIS, ASSIGNOR TO GARDEN CITY LABORATORY, OF CHICAGO, ILLINOIS, A CORPORATION OF ILLINOIS.

NEUTRAL SOLDERING-FLUX.

No. 851,813.　　　Specification of Letters Patent.　　　Patented April 30, 1907.

Application filed August 20, 1906. Serial No. 331,387.

*To all whom it may concern:*

Be it known that I, OSCAR J. LANIGAN, a citizen of the United States, residing at Chicago, in the county of Cook and State of Illinois, have invented a certain new, useful, and Improved Neutral Soldering-Flux, of which the following is a full, clear, and exact description, such as will enable one skilled in the art to which it appertains to make and use the same.

My invention relates to improvements in soldering flux and the object of the invention is to provide a neutral flux for soldering the seams or caps of tin cans and the like.

A further object of the invention is to provide a soldering flux which shall be substantially inactive, when first applied, but which shall become active when the soldering iron is pressed upon the fluxed seam, in other words, when heated.

With these objects in view my invention consists in a liquid soldering flux comprising substantially equal proportions of glycerin and ammonium lactate prepared and admixed or compounded, substantially as hereinafter set forth.

In manufacturing my novel flux I first obtain or prepare the ingredients as follows: sixty-five parts of glycerin; forty-nine parts of lactic acid; and fourteen parts of 4 F ammonia.

The glycerin is the ordinary commercial product of about 1.260 specific gravity. The lactic acid which I use is preferably commercial lactic acid, having a specific gravity approximating 1.070 and which comprises approximately 22% of pure lactic acid and 78% of water. I first mix the lactic acid and ammonia, thereby producing ammonium lactate, and this having been prepared, a quantity thereof is admixed with a substantially equal quantity of the glycerin. The fluids are mixed at normal temperature and the resultant fluid is a neutral compound or solution of glycerin and ammonium lactate, permanent at ordinary temperatures.

The compound or flux, because it is neither acidulous or alkaline, does not deleteriously effect canned food products. It is therefore particularly adapted for use in soldering cans which are intended to receive or which have been filled with fruits or vegetables.

In use, the soldering flux is spread or otherwise applied to the seam of the can, which is to soldered, and upon being headed, by the soldering iron, decomposes. The ammonia liberated by such decomposition quickly evaporates and the lactic acid enters into solution with the glycerin, thereby quickening the flux. Obviously the then solution of lactic acid and glycerin will remove all oxids and impurities from the tinned surfaces thereby insuring the proper sweating or penetration of the solder in the seam.

By reason of its repugnance to decomposition, except under high temperatures, the small quantity of flux, which may have been spread upon the tinned surfaces not included in the heated area of the soldering iron, retains its neutral form and is therefore unobjectionable.

Obvious modifications and substitutions of equivalents are included within the scope of my invention, as all such would readily suggest themselves to one skilled in the art.

Having thus described my invention, I claim as new and desire to secure by Letters Patent:

1. A neutral soldering flux, comprising substantially equal proportions of glycerin and ammonium lactate, substantially as described.

2. A neutral, liquid soldering flux, comprising substantially equal proportions of glycerin and ammonium lactate, admixed in the manner herein described and adapted for decomposition by heat, substantially as described.

In testimony whereof, I have hereunto set my hand, this 16th day of August, 1906, in the presence of two subscribing witnesses.

OSCAR J. LANIGAN.

Witnesses:
　A. W. NELSON,
　F. G. KNIGHT.